(12) United States Patent
Mitchell (10) Patent No.: US 9,253,294 B2
(45) Date of Patent: Feb. 2, 2016

(54) DEVICE AND METHOD FOR PROVIDING A CONTIGUOUS DISPLAY AREA

(75) Inventor: Andrew Mitchell, Woking (GB)

(73) Assignee: Nokia Technologies Oy, Espoo (FI)

( * ) Notice: Subject to any disclaimer, the term of this patent is extended or adjusted under 35 U.S.C. 154(b) by 619 days.

(21) Appl. No.: 13/061,175

(22) PCT Filed: Aug. 29, 2008

(86) PCT No.: PCT/EP2008/007082
§ 371 (c)(1),
(2), (4) Date: Oct. 13, 2011

(87) PCT Pub. No.: WO2010/022753
PCT Pub. Date: Mar. 4, 2010

(65) Prior Publication Data
US 2012/0092815 A1    Apr. 19, 2012

(51) Int. Cl.
*G06F 1/16* (2006.01)
*H04M 1/02* (2006.01)

(52) U.S. Cl.
CPC ........... *H04M 1/0247* (2013.01); *G06F 1/1616* (2013.01); *G06F 1/1641* (2013.01)

(58) Field of Classification Search
CPC ... G06F 1/1616; G06F 1/1641; G06F 1/1615; G06F 1/1677; G06F 1/1681; G06F 1/203; H04M 1/0247; H04M 1/0206; H04M 1/021; H04M 1/0214; H04M 1/0218; H04M 1/0222; H04M 1/022; H04M 1/0249
USPC ............. 361/679.26–679.28; 455/566, 575.1, 455/575.3; 345/1.1, 2.2
See application file for complete search history.

(56) References Cited

U.S. PATENT DOCUMENTS

| | | | |
|---|---|---|---|
| 7,492,577 B2 * | 2/2009 | Tomizuka et al. ....... | 361/679.27 |
| 7,848,786 B2 * | 12/2010 | Liu ....................... | G06F 3/0221 455/575.1 |
| 2008/0013265 A1 * | 1/2008 | Kim .............................. | 361/681 |
| 2009/0275366 A1 * | 11/2009 | Schilling ............... | G06F 1/1615 455/566 |
| 2010/0041439 A1 * | 2/2010 | Bullister ...................... | 455/566 |

* cited by examiner

*Primary Examiner* — Hoa C Nguyen
*Assistant Examiner* — Christopher L Augustin
(74) *Attorney, Agent, or Firm* — Harrington & Smith (57) ABSTRACT

A device comprising a first and a second housing body and a display. The display has a first and a second display portion which are hingably connected to each other. Each display portion has a front face. The first housing body is hingably connected to the first display portion and hingably connected to the second housing body and the second housing body is hingably connected to the second display portion. And the device is configured to assume an open position and a closed position. The front faces of the display portions are arranged adjacent and facing each other in the closed position.

19 Claims, 5 Drawing Sheets

DEVICE AND METHOD FOR PROVIDING A CONTIGUOUS DISPLAY AREA

RELATED APPLICATION

This application was originally filed as PCT Application No. PCT/EP2008/007082 on Aug. 29, 2008, which is incorporated herein by reference in its entirety.

FIELD

The present application relates to a device and a method for providing large display areas, and in particular to a device and a method for providing a contiguous display area.

BACKGROUND

More and more electronic devices such as mobile phones, MP3 players, Personal Digital Assistants (PDAs) and internet tablets are becoming smaller and smaller while having more and more information stored on and/or accessible through them. Users are relying on such devices and becoming all the more dependant on them and thus they should be designed to be small and easy to carry around. This requirement often conflicts with the requirement of having a large screen for providing a user with a good overview of the applications currently running on such a device. The trade-off of having a large screen and making the device small is a longstanding problem that designers are posed with when designing a new device.

Also, a larger display or screen is more prone to outer physical influences, simply because of its larger size and is thus more prone to being damaged like being scratched. To protect a display it has been known to arrange the display in a clam shell like apparatus where the device is folded together so that the display is protected. However, this separates the display from the main control means due to the hinge and other physical arrangement needed to provide the folding functionality.

A device that allows a large and easy to overview display while being small and easy to carry around and preferably protecting the display would be useful in modern day society.

SUMMARY

On this background, it would be advantageous to provide a device and a method that overcomes or at least reduces the drawbacks indicated above by providing a device having a hingably connected display comprising two display portions that are movable in relation to each other.

The disclosed embodiments provide a device comprising a first and a second housing body and a display, said display comprising a first and a second display portion which are hingably connected to each other and each display portion having a front face, wherein said first housing body is hingably connected to said first display portion and hingably connected to said second housing body and said second housing body is hingably connected to said second display portion, and wherein said device is configured to assume an open position and a closed position.

In one embodiment said front faces of said display portions are arranged adjacent and facing each other in said closed position.

This allows for two display portions to be used to form a large contiguous or coherent display when opened, while still being able to be stored and protected in a device capable of being folded up thus reducing its overall size and becoming small and easy to carry around.

In one embodiment the display portions are arranged side by side position so that normals to said front faces are substantially parallel. In one embodiment the normals to said front faces are arranged at an angle being less than degrees to one another. This provides for a uniform display area.

In one embodiment the device further comprises a hinge configured to connect one of said display portions to said housing body said hinge being movable in a direction parallel to a plane constituted by said housing body's main operating orientation or extent. This allows the device to be fully opened while maintaining the two display portions adjacent each other as it allows the hinges to move to countereffect the changes in the device's geometry as the portions and housing bodies are rotated around their hinges.

In one embodiment the device further comprises a hinge configured to connect one of said display portions to said housing body said hinge being movable in a direction perpendicular to a plane constituted by said housing body's main operating orientation or extent. This also allows the display portions to move to a position offset the resting position so that the display can be protected by the device in the closed position.

In one embodiment at least one of said housing bodies comprises a recess configured to receive at least one display portion, said recess extending through a side adjacent to where said housing bodies are hingably connected. This recess provides better protection for the display.

In one embodiment the display portions are arranged in an angle with respect to one another in said open position, said angle being substantially different from 180 degrees so that normals to said front faces are not parallel. This provides for a more versatile use of the device in that it can assume a position where the display is tilted and one portion may be used for input while the other is used for output.

In one embodiment the display portions are arranged in an angle with respect to one another in a second open position, said angle being substantially different from 180 degrees so that normals to said front faces are not parallel. This provides for a more versatile use of the device in that it can assume a position where the display is tilted and one portion may be used for input while the other is used for output.

In one embodiment at least one of said display portions is a touch display and wherein a virtual keyboard is arranged on said touch display in said open position.

The aspects of the disclosed embodiments are also directed to providing a device comprising a first and a second housing body and display means, said display means comprising a first and a second display portion comprising hinge means for hingably connecting said display portions to each other and each display portion having a front face, wherein said first housing body comprises hinge means for hingably connecting to said first display portion and hinge means for hingably connecting to said second housing body and said second housing body comprises hinge means for hingably connecting to said second display portion, and wherein said device comprises means for arranging said device in an open position and a closed position, wherein said front faces of said display portions are arranged adjacent and facing each other in said closed position.

In one embodiment the device is taken from a group comprising mobile terminals, personal digital assistant, game console, MP3 player, media player, personal organizer and internet tablet.

These devices all share the advantages that they provide protection to a large display and which display is capable of providing a user with a large contiguous or coherent display area while still allowing the device to be easy and small to carry around.

The methods and their embodiments described below share the advantages of the devices described above.

The aspects of the disclosed embodiments are also directed to providing a method of opening a device comprising starting in a closed position and rotating a first and a second housing body in a first rotational direction, rotating a first display portion relative a said second display portion in said first rotational direction, rotating said first display portion relative said first housing portion first in said first rotational direction and secondly in a rotational direction opposite said first rotational direction as a midway position of said first and second display portions is reached and rotating said second display portion relative said second housing portion first in a rotational direction opposite said first rotational direction and secondly in said first rotational direction as said midway position of said first and second display portions is reached.

The aspects of the disclosed embodiments are also directed to providing a method of opening a device comprising a first and second housing body and a display comprising a first and a second display portion which are hingably connected to each other and each display portion having a front face, wherein said first housing body is hingably connected to said first display portion and hingably connected to said second housing body and said second housing body is hingably connected to said second display portion, said method comprising starting in a closed position wherein said front faces are facing each other and rotating said first and second housing bodies around an axis of said hingable connection in a first rotational direction, rotating said first display portion relative said second display portion in said first rotational direction, rotating said first display portion relative said first housing portion first in said first rotational direction and secondly in a rotational direction opposite said first rotational direction as a midway position of said first and second display portions is reached and rotating said second display portion relative said second housing portion first in a rotational direction opposite said first rotational direction and secondly in said first rotational direction as said midway position of said first and second display portions is reached.

In one embodiment the rotations are performed simultaneously. This allows a device to be closed in one smooth operation.

In one embodiment the midway position is reached as normals to said front faces are at an angle to each other of between 30 to 60 degrees.

It should be noted that other angles are also possible and that they depend on the geometry of the device and also upon other design issues.

In one embodiment the method further comprises starting an application as said midway position is reached.

The aspects of the disclosed embodiments are also directed to providing a method of closing a device comprising starting in an open position wherein front faces of a first and a second display portion are not facing each other and normals to said front faces are not parallel and rotating a first and a second housing body in a second rotational direction, maintaining said first and second display portions in an end position relative to the first and second display portions and rotating said first display portion relative said second display portion in said second rotational direction when said first and second said end position is no longer maintained, rotating said first display portion relative said first housing portion first in said second rotational direction while an end position of said first and second display portions is maintained and secondly in a rotational direction opposite said second rotational direction and rotating said second display portion relative said second housing portion first in a rotational direction opposite said second rotational direction while an end position of said first and second display portions is maintained and secondly in said second rotational direction.

The aspects of the disclosed embodiments are also directed to providing a method of closing a device comprising a first and second housing body and a display comprising a first and a second display portion which are hingably connected to each other and each display portion having a front face, wherein said first housing body is hingably connected to said first display portion and hingably connected to said second housing body and said second housing body is hingably connected to said second display portion, said method comprising starting in an open position wherein said front faces are not facing each other and normals to said front faces are not parallel and rotating said first and second housing bodies around an axis of said hingable connection in a second rotational direction, maintaining said first and second display portions in an end position relative to the first and second display portions and rotating said first display portion relative said second display portion in said second rotational direction when said first and second said end position is no longer maintained, rotating said first display portion relative said first housing portion first in said second rotational direction while an end position of said first and second display portions is maintained and secondly in a rotational direction opposite said second rotational direction and rotating said second display portion relative said second housing portion first in a rotational direction opposite said second rotational direction while an end position of said first and second display portions is maintained and secondly in said second rotational direction.

In one embodiment the rotations are performed simultaneously. This allows a device to be closed in one smooth operation.

In one embodiment the end position is maintained while normals to said front faces are substantially parallel to each other.

In one embodiment the end position is maintained as normals to said front faces are at an angle to each other of less than 5 degrees to one another.

In one embodiment the end position is maintained as normals to said front faces are at an angle to each other of less than 10 degrees to one another.

Further objects, features, advantages and properties of device, method and computer readable medium according to the present application will become apparent from the detailed description.

BRIEF DESCRIPTION OF THE DRAWINGS

In the following detailed portion of the present description, the teachings of the present application will be explained in more detail with reference to the example embodiments shown in the drawings, in which.

DETAILED DESCRIPTION

In the following detailed description, the device, the method and the software product according to the teachings for this application in the form of a cellular/mobile phone will be described by the embodiments. It should be noted that although only a mobile phone is described the teachings of this application can also be used in any electronic device such as in portable electronic devices such as laptops, PDAs, mobile communication terminals, electronic books and notepads and other electronic devices offering access to information.

Figure 1:
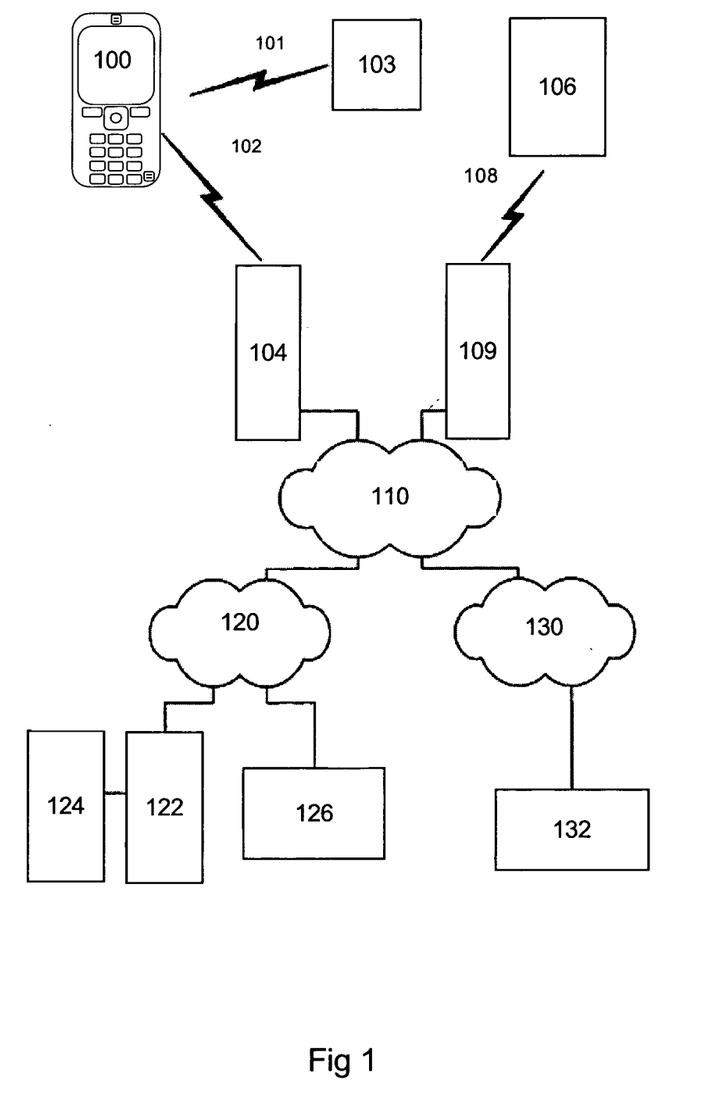
FIG. 1 is an overview of a telecommunications system in which a device according to the present application is used according to an embodiment.

FIG. 1 illustrates an example of a cellular telecommunications system in which the teachings of the present application may be applied. In the telecommunication system of FIG. 1, various telecommunications services such as cellular voice calls, www or Wireless Application Protocol (WAP) browsing, cellular video calls, data calls, facsimile transmissions, music transmissions, still image transmissions, video transmissions, electronic message transmissions and electronic commerce may be performed between a mobile terminal 100 according to the teachings of the present application and other devices, such as another mobile terminal 106 or a stationary telephone 132. It is to be noted that for different embodiments of the mobile terminal 100 and in different situations, different ones of the telecommunications services referred to above may or may not be available; the teachings of the present application are not limited to any particular set of services in this respect.

The mobile terminals 100, 106 are connected to a mobile telecommunications network 110 through Radio Frequency, RF links 102, 108 via base stations 104, 109. The mobile telecommunications network 110 may be in compliance with any commercially available mobile telecommunications standard, such as Group Spéciale Mobile, GSM, Universal Mobile Telecommunications System, UMTS, Digital Advanced Mobile Phone system, D-AMPS, The code division multiple access standards CDMA and CDMA2000, Freedom Of Mobile Access, FOMA, and Time Division-Synchronous Code Division Multiple Access, TD-SCDMA.

The mobile telecommunications network 110 is operatively connected to a wide area network 120, which may be Internet or a part thereof. An Internet server 122 has a data storage 124 and is connected to the wide area network 120, as is an Internet client computer 126. The server 122 may host a www/wap server capable of serving www/wap content to the mobile terminal 100.

A public switched telephone network (PSTN) 130 is connected to the mobile telecommunications network 110 in a familiar manner. Various telephone terminals, including the stationary telephone 132, are connected to the PSTN 130.

The mobile terminal 100 is also capable of communicating locally via a local link 101 to one or more local devices 103. The local link can be any type of link with a limited range, such as Bluetooth, a Universal Serial Bus (USB) link, a Wireless Universal Serial Bus (WUSB) link, an IEEE 802.11 wireless local area network link, a Radio Standard link for example an RS-232 serial link, etc. The local devices 103 can for example be various sensors that can communicate measurement values to the mobile terminal 100 over the local link 101.

Figure 2:
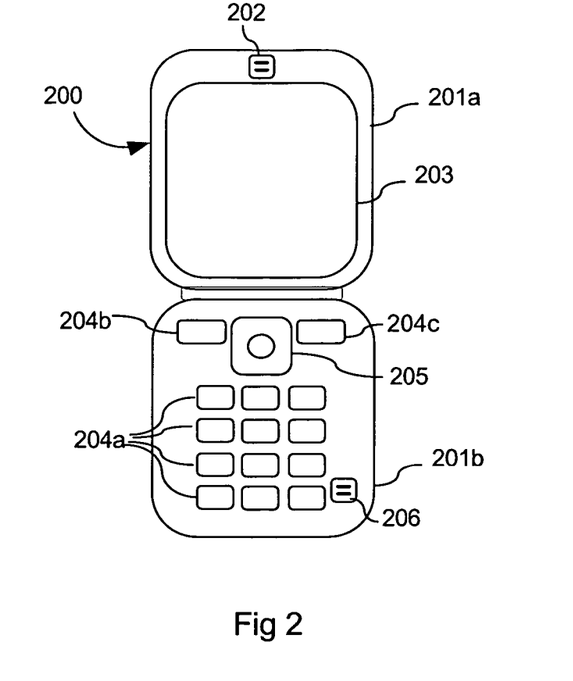
FIG. 2 is a plane front view of a device according to an embodiment.

An embodiment 200 of a prior art mobile terminal is illustrated in detail in FIG. 2. The mobile terminal 200 comprises a first 201a and a second housing bodies 201b that together make up the mobile terminal. These housings 201 house a speaker or earphone 202, a microphone 206, a main or first display 203 and a set of keys 204 which may include a keypad 204a of common ITU-T type (alpha-numerical keypad representing characters "0"-"9", "*" and "#") and certain other keys such as soft keys 204b, 204c and a joystick 205 or other type of navigational input device.

In an alternative embodiment the keypad 204a is a virtual keypad implemented on a touchdisplay (not shown).

The two housings 210 restrict the size of the screen to not be larger than the size of a housing body 201. Even if a touchdisplay is used for implementing a virtual keypad and the touchdisplay is used as an addition to the display area the two display areas will still be divided and the user will not perceive a coherent display area.

Figure 3:
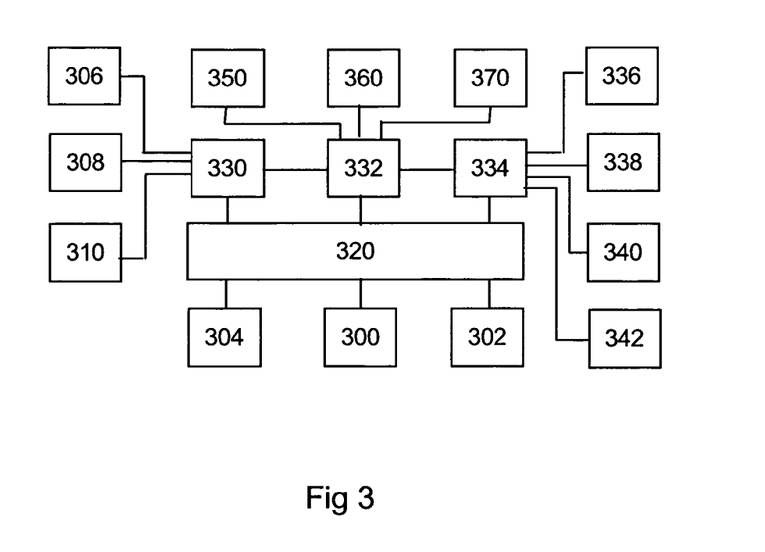
FIG. 3 is a block diagram illustrating the general architecture of a device of FIG. 2 in accordance with the present application.

An improved embodiment of the mobile terminal 200 of FIG. 2 is described in FIG. 4 and onwards having the same general structure and components as discussed with reference to FIGS. 1, 2 and 3.

The internal component, software and protocol structure of the mobile terminal 200 will now be described with reference to FIG. 3. The mobile terminal has a controller 300 which is responsible for the overall operation of the mobile terminal and may be implemented by any commercially available CPU ("Central Processing Unit"), DSP ("Digital Signal Processor") or any other electronic programmable logic device. The controller 300 has associated electronic memory 302 such as Random Access Memory (RAM) memory, Read Only memory (ROM) memory, Electrically Erasable Programmable Read-Only Memory (EEPROM) memory, flash memory, or any combination thereof. The memory 302 is used for various purposes by the controller 300, one of them being for storing data used by and program instructions for various software in the mobile terminal. The software includes a real-time operating system 320, drivers for a man-machine interface (MMI) 334, an application handler 332 as well as various applications. The applications can include a message text editor 350, a notepad application 360, as well as various other applications 370, such as applications for voice calling, video calling, sending and receiving Short Message Service (SMS) messages, Multimedia Message Service (MMS) messages or email, web browsing, an instant messaging application, a phone book application, a calendar application, a control panel application, a camera application, one or more video games, a notepad application, etc. It should be noted that two or more of the applications listed above may be executed as the same application.

The MMI 334 also includes one or more hardware controllers, which together with the MMI drivers cooperate with the first display 336/203, and the keypad 338/204 as well as various other Input/Output devices such as microphone, speaker, vibrator, ringtone generator, LED indicator, etc. As is commonly known, the user may operate the mobile terminal through the man-machine interface thus formed.

The software also includes various modules, protocol stacks, drivers, etc., which are commonly designated as 330 and which provide communication services (such as transport, network and connectivity) for a Radio frequency (RF) interface 306, and optionally a Bluetooth™ interface 308 and/or an IrDA (Infrared Data Association) interface 310 for local connectivity. The RF interface 306 comprises an internal or external antenna as well as appropriate radio circuitry for establishing and maintaining a wireless link to a base station (e.g. the link 102 and base station 104 in FIG. 1). As is well known to a man skilled in the art, the radio circuitry comprises a series of analogue and digital electronic components, together forming a radio receiver and transmitter. These components include, band pass filters, amplifiers, mixers, local oscillators, low pass filters, Analog to Digital and Digital to Analog (AD/DA) converters, etc.

The mobile terminal also has a Subscriber Identity Module (SIM) card 304 and an associated reader. As is commonly known, the SIM card 304 comprises a processor as well as local work and data memory.

Figure 4:
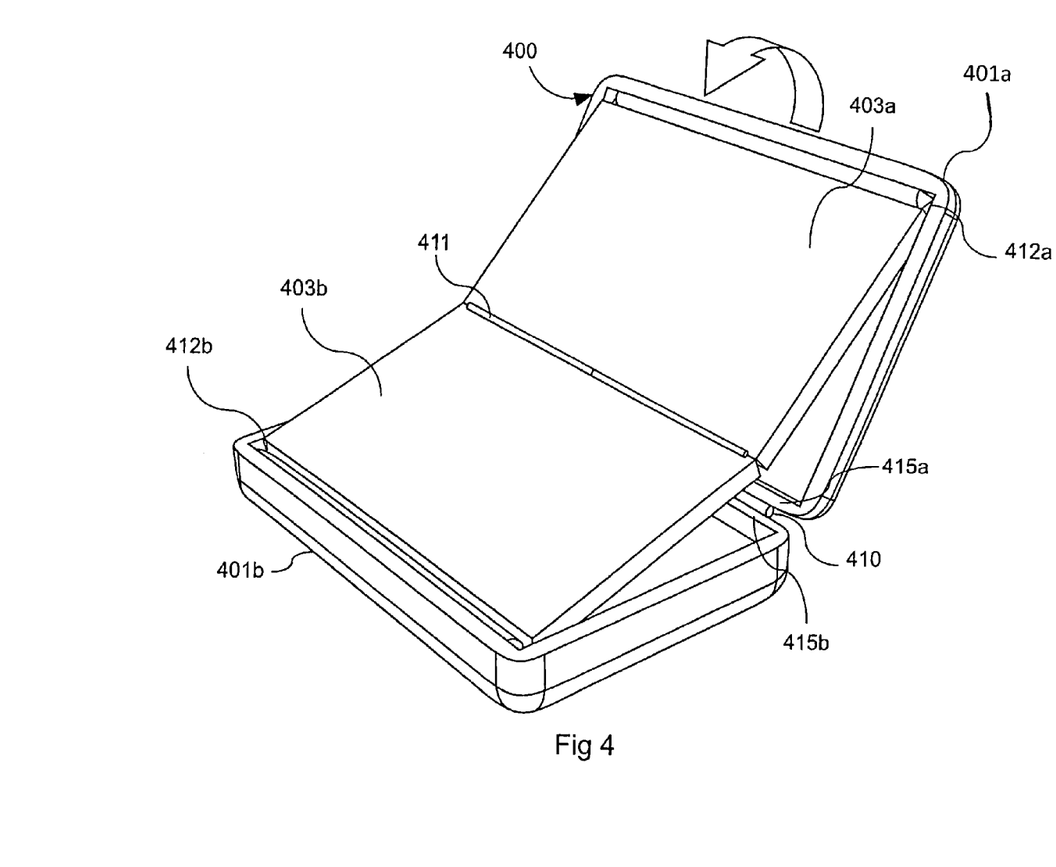
FIG. 4 is a view of a device according to an embodiment, FIGS. 5a, b, c, d, e and f are views of a device according to an embodiment.

FIG. 4 shows a device 400 according to an embodiment. The device has a first housing body 401a and a second housing body 401b that are connected through a hinge 410 so that they can be folded together in a closed position and folded apart in an open position. The arrow indicates the folding direction when going from an open to a closed position.

The device also has a display 403 consisting of two display portions, a first 403a and a second 403b that are connected to each other by a hinge 411. The two display portions 403a and 403b are arranged so that they can rotate around the hinge 411 so that they can assume an open and a closed position. In the closed position the front faces of the display portions 403 face each other. In the open position the front faces of the display portions 403 are directed away from each other so that a user can see both display portions simultaneously.

In one open position the two display portions 403a and 403b are flush with one another when in the open position. And in one embodiment the two display portions 403a and 403b abut each other. In one embodiment they abut each other through the hinge 412.

In one open position the two display portions' 403a and 403b front faces form a common plane and their normals are substantially parallel.

Since the display portions 403a and 403b are directly hinged to each other there is no gap in between them and as they are opened and the display portions 403a and 403b thus constitute a full coherent or contiguous display area.

In the opposite ends to where the display portions 403a and 403b are hinged together through the hinge 411 each display portion 403a and 403b are connected to a housing body 401a and 401b respectively. Display portion 403a is connected to housing body 401a through a hinge 412a and display portion 403b is connected to housing body 401b through a hinge 412b.

Figure 5A:
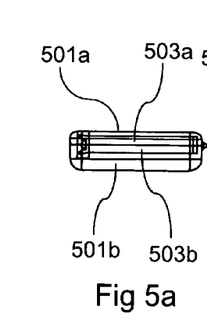
Figures 5B, 5C, 5D, 5E, 5F:
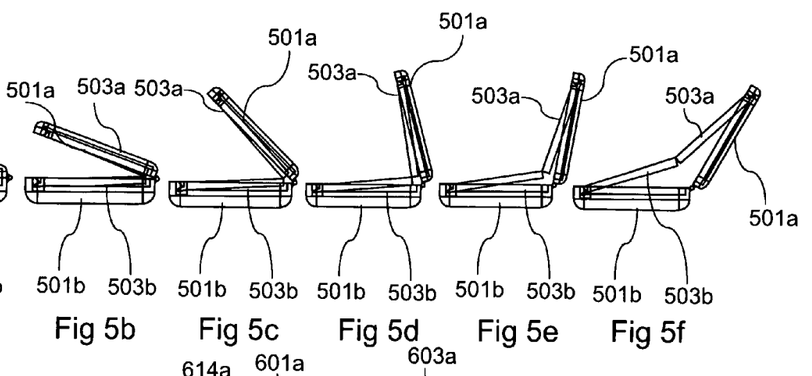

FIG. 5 shows how a device as in FIG. 4 is opened and how the display portions and the housing bodies move during the opening. If the sequence in FIG. 5 is viewed backwards it shows a closing maneuver and how the display portions 403 and the housing bodies 401 move during the closing maneuver.

In one embodiment one of or both the hinges 412 are movably attached to the housing body 401 to allow the hinge to move in relation to the housing body it is attached to. See FIG. 6 where an embodiment 600 of a device 400 as in FIG. 4 is shown with an enlargement of the hinge arrangement and the adjoining environment. A hinge 612 is connected to a housing body 601b and a display portion 603b so that the display portion 603b is rotatably connected to the housing body 601b. The hinge 612 is arranged in a groove 613 in the body housing 601b. This allows the hinge 612 to slide in the groove 613 and thus move in a direction parallel to the general extent of said housing body 601b or in other wording parallel to the main operating orientation of the housing body 601b as is indicated by the double sided arrow in FIG. 6.

Figure 6:
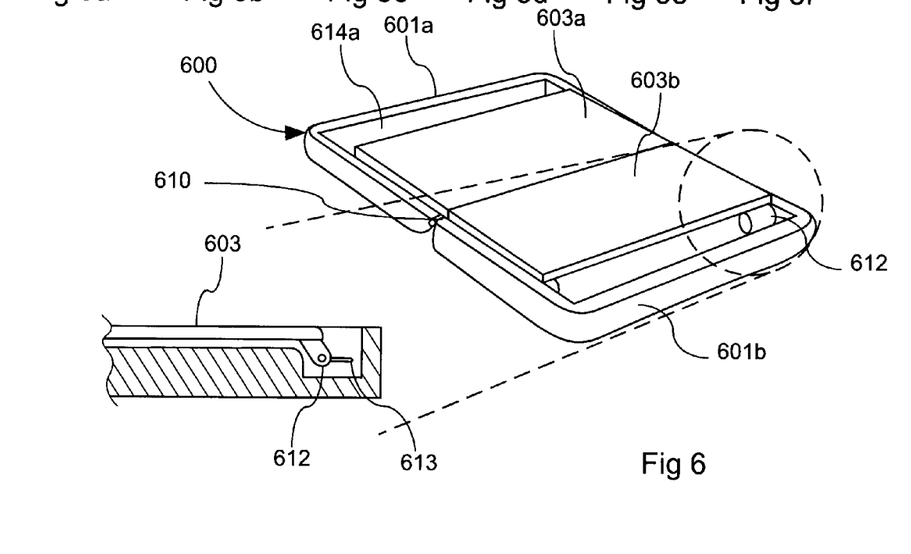
FIG. 6 is a view of a device according to an embodiment, FIGS. 7a and b are flow charts describing each a method according to an embodiment, and FIGS. 8a and b are flow charts describing each a method according to an embodiment.

This allows the display portions 603a and 603b to move relative to the housing bodies 601a and 601b which are stiff during the opening and closing which allows the device 600 to be opened to a flat position forming a contiguous display area where the display portions 603a and 603b are flush with one another.

In one embodiment the groove 613 is arranged in a direction perpendicular to the general extent of said housing body 601b which allows the display portion 603 to move upwards and downwards in relation to the housing body 601b. This provides for greater flexibility and also allows the display to be received in a recess 614 of the housing body 601 when the device is closed and for the display 603 to rest upon an edge 415 (see FIG. 4) of said recess 614 when in the open position. In one embodiment this edge 615 is the hinge 610.

In one embodiment the groove 613 is not straight which allows the display portion 603b and the hinge 612 to move in a pattern more suitable for a specific design.

It is to be understood that the movable hinge arrangement may be arranged in any or both of the housing bodies 601 and the display portions 603.

In one embodiment the hinge 610 is comprised of two hinges arranged on opposite sides of the housing bodies to allow an opening in the edge 415 (see FIG. 4) to allow the recesses 614a and 614b to form one coherent recess 614 when the device is open to receive the display 603. This allows the display 603 to be flush or lower than the device's 600 edges which protects the display 603 from physical damage such as scratches when the device 600 is open. This also provides increased stability in the open position if the device is designed so that the display almost abuts the edges of the recesses.

In one embodiment a flexible flap or other covering means such as a rubber wall (not shown) is arranged adjacent the opening in the edge 415 to prevent dust, moisture and other particles from entering the device 600.

In one embodiment one display portion 603a and/or 603b is a touch display. In one such embodiment the touch display is arranged to display a virtual keypad. This allows the device to be arranged and used in a manner similar to laptops which provides a user with a device that is easy to carry around and is highly versatile offering many uses.

Figure 7A:
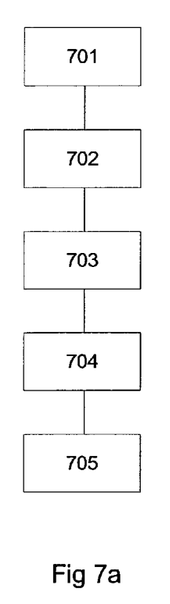

FIG. 7a is a flowchart describing how a device as above is opened and this method will be described with simultaneous reference to FIG. 5. In an initial step 701 the device is closed, see FIG. 5a. To open the device the housing bodies 501a and 501b are moved apart by rotating them around a hinge in a first rotational direction in a step 702. In this case the rotational direction is clockwise, see FIG. 5b. In a step 703 the display portions 503a and 503b start rotating around hinges in relation to each other and the housing body 501a and 501b respectively they are each connected to, see FIG. 5c. First the rotational direction of display portion 503a is the same as the first rotational direction and the rotational direction of display portion 503b is the opposite with relation to the housing body 501a and 501b respectively they are each attached to. As a midway position is reached in a step 704 the rotational directions of the display portions 503 in relation to the housing bodies 501 they are connected to change and become the opposite. See FIG. 5e and FIG. 5f. These rotational directions remain until the device assumes an open position in step 705.

The midway position depends on the geometry of the device, the housing bodies, the hinges and the display portions.

Figure 7B:
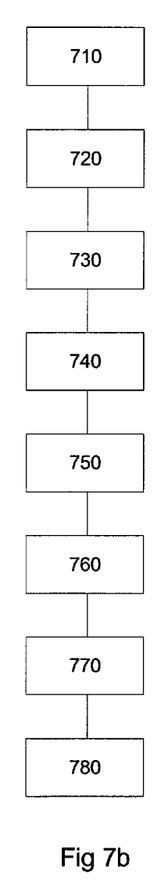

An alternative description of an opening method is disclosed in FIG. 7b.

Starting in a closed position, step 710, where said front faces are facing each other and in a step 720 rotating the first and second housing bodies around an axis of the hinge in a first rotational direction. And in a step 730 rotating the first display portion relative the second display portion in the first rotational direction. Then in a step 740 rotating the first display portion relative the first housing portion first in the first rotational direction and secondly in step 750 in a rotational direction opposite the first rotational direction as a midway position of the first and second display portions is reached. And in a step 760 rotating the second display portion relative the second housing portion first in a rotational direction opposite the first rotational direction and secondly in a step 770 in the first rotational direction as the midway position of the first and second display portions is reached.

In one embodiment some or all of the rotations are performed simultaneously.

Figure 8A:
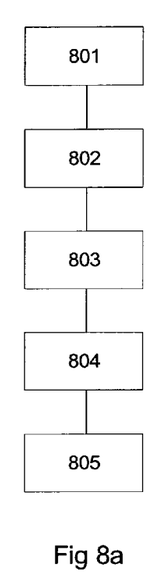

FIG. 8 is a flowchart describing how a device as above is closed and this method will be described with simultaneous reference to FIG. 5. In an initial step 801 the device is open, see FIG. 5*f*. To close the device the housing bodies 501*a* and 501*b* are rotated towards each other by rotating them around a hinge in a second rotational direction in a step 802. In this case the rotational direction is anti-clockwise, see FIG. 5*e*. In a step 803 the display portions 503*a* and 503*b* start rotating around hinges in relation to each other and the housing body 501*a* and 501*b* respectively they are connected to, see FIG. 5*e*. First the rotational direction of display portion 503*a* is the opposite as the second rotational direction and the rotational direction of display portion 503*b* is the same as the second rotational direction with relation to the housing body 501*a* and 501*b* respectively they are each attached to. As the end position of the display portions 503*a* and 503*b* is no longer able to be maintained by the geometry of the device and the parts it comprises in a step 804 the rotational directions of the display portions 503 in relation to the housing bodies 501 they are each connected to change and become the opposite. See FIG. 5*d* to FIG. 5*b*. These rotational directions remain until the device assumes a closed position in step 805, see FIG. 5*a*.

Figure 8B:
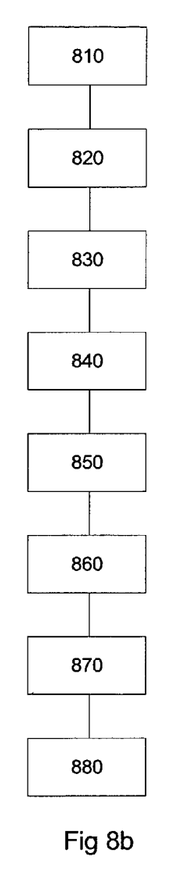

An alternative description of a closing method is disclosed in FIG. 8*b*.

Starting in an open position 810 where the front faces of the display portions are not facing each other and normals to said front faces are not parallel. Then rotating said first and second housing bodies around an axis of the hinge in a second rotational direction, step 820. In step 830 the first and second display portions are maintained in an end position relative to the first and second display portions and in step 840 rotating the first display portion relative the second display portion in said second rotational direction when the first and second the end position is no longer maintained. In step 850 the first display portion is rotated relative the first housing portion first in the second rotational direction while an end position of said first and second display portions is maintained and then in step 860 in a rotational direction opposite the second rotational direction. In step 870 the second display portion is rotated relative the second housing portion first in a rotational direction opposite the second rotational direction while an end position of the first and second display portions is maintained and then in the second rotational direction in step 880.

In one embodiment some or all of the rotations are performed simultaneously.

The various aspects of what is described above can be used alone or in various combinations. The teaching of this application may be implemented by a combination of hardware and software, but can also be implemented in hardware or software. The teaching of this application can also be embodied as computer readable code on a computer readable medium. It should be noted that the teaching of this application is not limited to the use in mobile communication terminals such as mobile phones, but can be equally well applied in Personal digital Assistants (PDAs), game consoles, MP3 players, personal organizers, internet tablets or any other device designed for providing information while being easy to carry around.

The teaching of the present application has numerous advantages. Different embodiments or implementations may yield one or more of the following advantages. It should be noted that this is not an exhaustive list and there may be other advantages which are not described herein. For example, one advantage of the teaching of this application is that a device is able to provide a large contiguous display area while being easy to carry around.

Another exemplary advantage is that such a device protection for a display while allowing the device to be small and easy to carry around.

Although the teaching of the present application has been described in detail for purpose of illustration, it is understood that such detail is solely for that purpose, and variations can be made therein by those skilled in the art without departing from the scope of the teaching of this application.

For example, although the teaching of the present application has been described in terms of a mobile phone, it should be appreciated that the teachings of the present application may also be applied to other types of electronic devices, such as music players, palmtop computers and the like. It should also be noted that there are many alternative ways of implementing the methods and apparatuses of the teachings of the present application.

Features described in the preceding description may be used in combinations other than the combinations explicitly described.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The term "comprising" as used in the claims does not exclude other elements or steps. The term "a" or "an" as used in the claims does not exclude a plurality. A unit or other means may fulfill the functions of several units or means recited in the claims.

The invention claimed is:

1. An apparatus comprising a first and a second housing body and a display, said display comprising a first and a second display portion which are hingably connected to each other and each of the first and the second display portions having a front face, wherein said first housing body is hingably connected to said first display portion and hingably connected to said second housing body and said second housing body is hingably connected to said second display portion, and wherein said apparatus is configured to assume an open position and a closed position, and wherein each of the first and second display portions comprise a first end and a second end and each of the first and second housing bodies comprise a first end and a second end, the first and second display portions are hingably connected to each other by a first hinge at the first ends of the first and second display portions and the first and second housing bodies are hingably connected to each other by a second hinge at the first ends of the first and second housing bodies, and the second end of the first display portion is hingably connected to the second end of the first housing body by a third hinge and the second end of the second display portion is hingably connected to the second end of the second housing body by a fourth hinge, wherein axes of the first, second, third, and fourth hinges are all substantially parallel to each other.

2. The apparatus according to claim 1 wherein said display portions are arranged side by side position so that normals to said front faces are substantially parallel.

3. The apparatus according to claim 2 wherein said normals to said front faces are arranged at an angle being less than 5 degrees to one another.

4. The apparatus according to claim 1 wherein the third hinge is configured to connect one of said display portions to said housing body said third hinge being movable in a direction parallel to a plane constituted by said housing body's main operating orientation.

5. The apparatus according to claim 1 wherein the fourth hinge is configured to connect one of said display portions to said housing body said fourth hinge being movable in a direction perpendicular to a plane constituted by said housing body's main operating orientation.

6. The apparatus according to claim 1 wherein at least one of said housing bodies comprises a recess configured to receive at least one display portion, said recess extending through a side adjacent to where said housing bodies are hingably connected.

7. The apparatus according to claim 1 wherein said display portions are arranged in an angle with respect to one another in said open position, said angle being substantially different from 180 degrees so that normals to said front faces are not parallel.

8. The apparatus according to claim 2 wherein said display portions are arranged at an angle with respect to one another in a second open position, said angle being substantially different from 180 degrees so that normals to said front faces are not parallel.

9. The apparatus according to claim 1 wherein at least one of said display portions is a touch display and wherein a virtual keyboard is arranged on said touch display in said open position.

10. The apparatus according to claim 1, wherein the apparatus is any of a mobile phone, a personal digital assistant, a games console, a MP3player, a personal organizer, and an internet tablet.

11. A method comprising starting in a closed position and rotating a first and a second housing body in a first rotational direction, rotating a first display portion relative a said second display portion in said first rotational direction, rotating said first display portion relative said first housing portion in said first rotational direction and in a rotational direction opposite said first rotational direction as a midway position of said first and second display portions is reached and rotating said second display portion relative said second housing portion in a rotational direction opposite said first rotational direction and in said first rotational direction as said midway position of said first and second display portions is reached, wherein each of the first and second display portions comprise a first end and a second end and each of the first and second housing bodies comprise a first end and a second end, the first and second display portions are hingably connected to each other by a first hinge at the first ends of the first and second display portions and the first and second housing bodies are hingably connected to each other by a second hinge at the first ends of the first and second housing bodies, and the second end of the first display portion is hingably connected to the second end of the first housing body by a third hinge and the second end of the second display portion is hingably connected to the second end of the second housing body by a fourth hinge, wherein axes of the first, second, third, and fourth hinges are all substantially parallel to each other.

12. The method according to claim 11 said rotations are performed simultaneously.

13. The method according to claim 11 wherein said midway position is reached as normals to said front faces are at an angle to each other of between 30 to 60 degrees.

14. The method according to claim 11 further comprising starting an application as said midway position is reached.

15. A method comprising starting in an open position wherein front faces of a first and a second display portion are not facing each other and normals to said front faces are not parallel and rotating a first and a second housing body in a second rotational direction, maintaining said first and second display portions in an end position relative to the first and second display portions and rotating said first display portion relative said second display portion in said second rotational direction when said first and second said end position is no longer maintained, rotating said first display portion relative said first housing portion in said second rotational direction while an end position of said first and second display portions is maintained and in a rotational direction opposite said second rotational direction and rotating said second display portion relative said second housing portion in a rotational direction opposite said second rotational direction while an end position of said first and second display portions is maintained and in said second rotational direction, wherein each of the first and second display portions comprise a first end and a second end and each of the first and second housing bodies comprise a first end and a second end, the first and second display portions are hingably connected to each other by a first hinge at the first ends of the first and second display portions and the first and second housing bodies are hingably connected to each other by a second hinge at the first ends of the first and second housing bodies, and the second end of the first display portion is hingably connected to the second end of the first housing body by a third hinge and the second end of the second display portion is hingably connected to the second end of the second housing body by a fourth hinge, wherein axes of the first, second, third, and fourth hinges are all substantially parallel to each other.

16. The method according to claim 15 said rotations are performed simultaneously.

17. The method according to claim 15 wherein said end position is maintained while normals to said front faces are substantially parallel to each other.

18. The method according to claim 15 wherein said end position is maintained as normals to said front faces are at an angle to each other of less than 5 degrees to one another.

19. An apparatus comprising a first and a second housing body and display, said display comprising a first and a second display portion comprising a first hinge configured to hingably connect said display portions to each other and each display portion having a front face, wherein said first housing body comprises a third hinge configured to hingably connect to said first display portion and a second hinge for hingably connecting to said second housing body and said second housing body comprises a fourth hinge for configured to hingably connect to said second display portion, wherein said apparatus is configured to arrange said apparatus in an open position and a closed position, wherein said front faces of said display portions are arranged adjacent and facing each other in said closed position, and     wherein each of the first and second display portions comprise a first end and a second end and each of the first and second housing bodies comprise a first end and a second end,     the first and second display portions are hingably connected to each other by the first hinge at the first ends of the first and second display portions and the first and second housing bodies are hingably connected to each other by the second hinge at the first ends of the first and second housing bodies, and     the second end of the first display portion is hingably connected to the second end of the first housing body by the third hinge and the second end of the second display portion is hingably connected to the second end of the second housing body by the fourth hinge,     wherein axes of the first, second, third, and fourth hinges are all substantially parallel to each other.

* * * * *